(12) United States Patent
Reuzel

(10) Patent No.: US 11,340,971 B2
(45) Date of Patent: May 24, 2022

(54) APPLICATION INTEGRATION USING INTERACTION PATTERNS

(71) Applicant: KONINKLIJKE PHILIPS N.V., Eindhoven (NL)

(72) Inventor: Johan Gerhard Herman Reuzel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 3 days.

(21) Appl. No.: 17/111,574

(22) Filed: Dec. 4, 2020

(65) Prior Publication Data

US 2021/0182131 A1 Jun. 17, 2021

Related U.S. Application Data

(60) Provisional application No. 62/947,028, filed on Dec. 12, 2019.

(51) Int. Cl.
*G06F 9/54* (2006.01)
*G06F 16/955* (2019.01)
*H04L 67/133* (2022.01)

(52) U.S. Cl.
CPC .......... *G06F 9/547* (2013.01); *G06F 16/9566* (2019.01); *H04L 67/40* (2013.01)

(58) Field of Classification Search
CPC ...... G06F 9/541; G06F 9/547; G06F 16/9566; G06F 9/54; H04L 67/40
See application file for complete search history.

(56) References Cited

U.S. PATENT DOCUMENTS

| 9,936,005 | B1 | 4/2018 | Palladino et al. |
| 2002/0026592 | A1 | 2/2002 | Gavrila |
| 2008/0120400 | A1 | 5/2008 | Keller et al. |
| 2012/0296929 | A1* | 11/2012 | Hossain ............... G06F 16/951 707/769 |
| 2012/0311672 | A1 | 12/2012 | Connor |
| 2016/0019102 | A1* | 1/2016 | Cui ........................ G06F 9/542 719/328 |

(Continued)

OTHER PUBLICATIONS

"Envoy", https://www.envoyproxy.io/docs/envoy/latest/api/api, Accessed Dec. 1, 2020.

(Continued)

*Primary Examiner* — Brian W Wathen

(57) ABSTRACT

The present disclosure relates to controlling communication between various applications or integrating various applications using interaction patterns. Interaction pattern data, which defines multiple roles for an interaction pattern is generated. Each role is associated with a transaction and is a source or target of a transaction. A transaction is performed using an application programming interface (API). A role can be a provider, or a consumer of the API based on whether the role is a source or target of the transaction. Application conformance data, which defines a set of roles implemented by the application is generated. An application is permitted to invoke an API of another application, if the application implements a first role and the other application implements a second role, and the first role and the second role are a source and target, respectively, of a transaction performed using the API.

27 Claims, 10 Drawing Sheets

(56) References Cited

U.S. PATENT DOCUMENTS

| | | | |
|---|---|---|---|
| 2016/0026710 A1* | 1/2016 | Laredo | G06F 9/541 |
| | | | 707/748 |
| 2016/0267153 A1* | 9/2016 | Witkop | G06F 21/629 |
| 2017/0289307 A1 | 10/2017 | Thompson et al. | |
| 2018/0196647 A1* | 7/2018 | Batinich | G06F 9/541 |
| 2018/0217871 A1* | 8/2018 | Doshi | G06Q 30/04 |
| 2019/0034199 A1 | 1/2019 | Pollock | |
| 2020/0301761 A1* | 9/2020 | Bharti | G06F 8/24 |
| 2020/0302050 A1* | 9/2020 | Jain | H04L 63/0884 |
| 2020/0326913 A1* | 10/2020 | Ying | G06F 9/54 |
| 2021/0019307 A1* | 1/2021 | Torres | G06F 16/243 |

OTHER PUBLICATIONS

International Search Report and Written Opinion, International Application No. PCT/EP2020/085393, dated Mar. 10, 2021.

\* cited by examiner

APPLICATION INTEGRATION USING INTERACTION PATTERNS

BACKGROUND

1. Field

The present patent application discloses various systems and methods relating to using interaction patterns for integrating applications.

2. Description of the Related Art

Software in computer systems provides a machine-to-machine interface, which is typically called an application programming interface (API). These APIs can be used by applications to initiate a process or method at another application. The APIs are typically formalized in machine-parsable formats like OpenAPI and web service definition language (WSDL). However, such specifications merely provide the syntax (and partially semantics) of messages going in and out a service implementing the API. When multiple APIs are somehow related (e.g. a service may have to implement two APIs, or a service implementing a certain API is required to invoke some other API), these API specification methods fail to represent these relationships. Such multi-API interactions and corresponding behavior requirements may sometimes be specified. However, they are not captured in machine-parsable definitions, and as such may not be used in application logic (for example to scaffold or automate multi-API test suites). Service registries typically expose which services are able to implement the server-side of an API. What is typically not registered are the potential clients to such an API. Without client registration, system dependencies cannot be queried, tracked or controlled.

SUMMARY

Accordingly, one or more aspects of the present disclosure relate to a method for controlling communication between a plurality of applications, the method being implemented by one or more processors executing one or more computer program instructions such that, when executed, the one or more processors effectuate the method of generating interaction pattern data which defines, for each of a plurality of interactions, a plurality of roles. Each role is associated with a transaction that is performed with another role, wherein the transaction is performed using an application programming interface (API). The method further includes generating application conformance data, which defines, for each of a plurality of applications, a set of roles implemented by the corresponding application. The method further includes generating application instance data, which includes location data of a plurality of APIs associated with an instance of an application. The method includes controlling communication between a first application and a second application based on the interaction pattern data, the application conformance data, and the application instance data (collectively referred to as "configuration data").

Another aspect of the present disclosure relates to a method for controlling communication between a plurality of applications, the method being implemented by one or more processors executing one or more computer program instructions such that, when executed, the one or more processors effectuate the method of receiving, at a server, a request from a first application of a plurality of applications to invoke a specified API associated with a second application of the plurality of applications. The method includes obtaining the interaction pattern data from a storage system, in which the interaction pattern data defines each of a plurality of interactions using a plurality of roles, wherein each role is configured to consume an API from another role, or provide the API to another role. The method also included obtaining application conformance data from a storage system, in which the application conformance data defines, for each of a plurality of applications, a set of roles implemented by the corresponding application. The method further includes determining, by the server, based on the application conformance data, that the first application is configured to implement a first role and the second application is configured to implement a second role, and the interaction pattern data indicates that the first role is configured to consume the specified API associated with the second role. The method further includes permitting, by the server, the first application to invoke the specified API of the second application.

Yet another aspect of the present disclosure relates to a system controlling communication between a plurality of applications in a computer network, the system comprising one or more processors configured by machine-readable instructions to: generate interaction pattern data, which defines each interaction of a plurality of interactions using a plurality of roles. Each role is associated with a transaction that is performed with another role, wherein the transaction is performed using an API. The system is further configured to generate application conformance data, which defines, for each of a plurality of applications, a set of roles implemented by the corresponding application. The system is further configured to generate application instance data, which includes location data of a plurality of APIs associated with an instance of an application. The system is further configured to control communication between a first application and a second application based on the configuration data.

Still yet another aspect of the present disclosure relates to a system controlling communication between a plurality of applications in a computer network, the system comprising one or more processors configured by machine-readable instructions to: obtain configuration data from a configuration subsystem, which includes interaction pattern data, application conformance data, and application instance data. The interaction pattern data may define an interaction using a plurality of roles, wherein each role is a consumer of an application programming interface (API) or a provider of the API. The application conformance data can define a set of roles implemented by an application, and the application instance data can include network address of a plurality of APIs associated with an instance of the application. The system can further configure a gateway subsystem based on the configuration data to generate network route data for routing a request, from a first application for accessing a specified API associated with a second application, to a specified network address associated with the specified API. The system is further configured to control communication between the first application and the second application via the gateway subsystem based on the configuration data.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DETAILED DESCRIPTION OF EXEMPLARY EMBODIMENTS

As used herein, the singular form of "a", "an", and "the" include plural references unless the context clearly dictates otherwise. As used herein, the term "or" means "and/or" unless the context clearly dictates otherwise. As employed herein, the term "number" shall mean one or an integer greater than one (i.e., a plurality).

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Figure 1A:
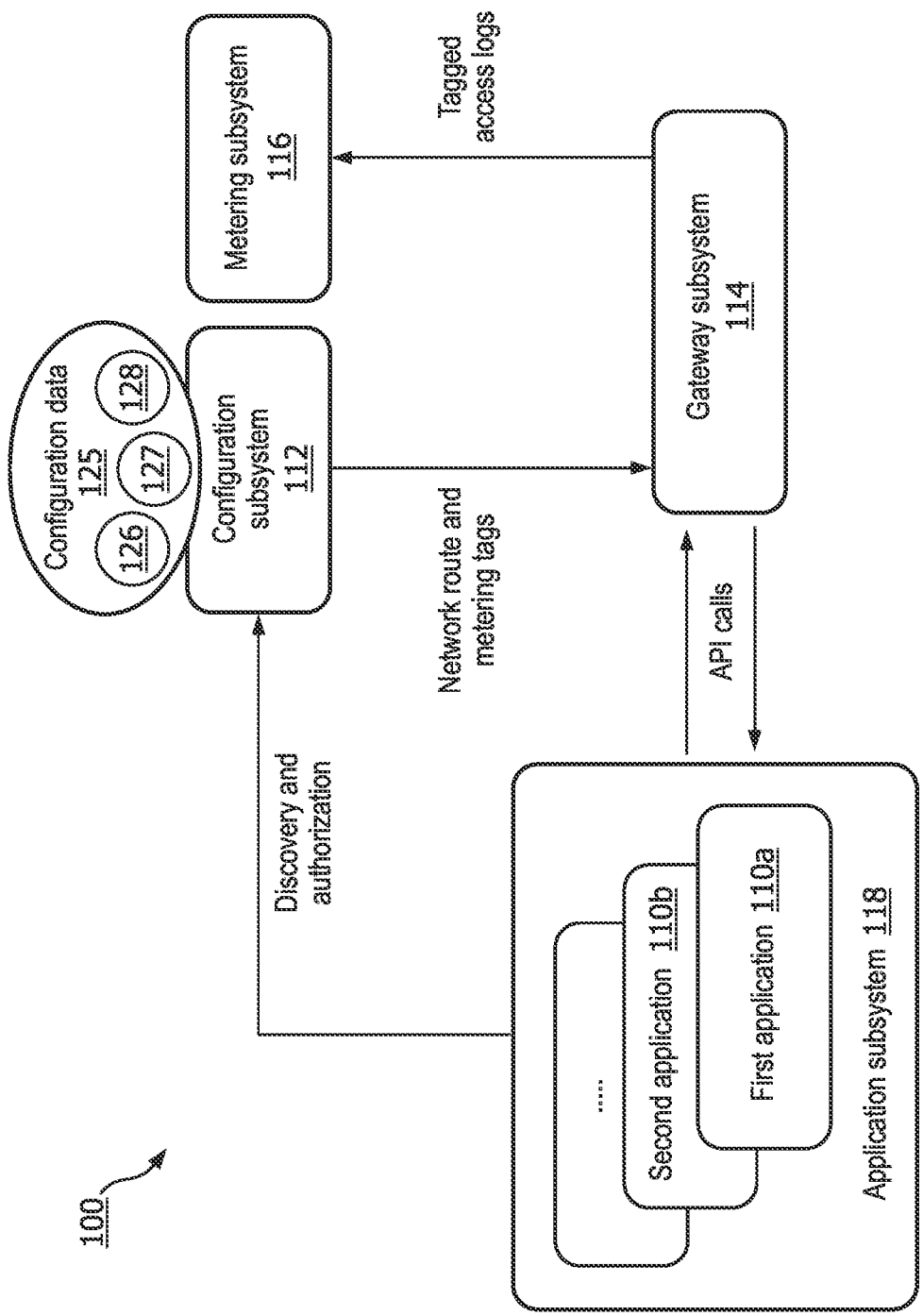
FIGS. 1A and 1B show a system for controlling (coordinating or facilitating) communication between applications in a computer network, in accordance with various embodiments.

FIG. 1A shows a system 100 for controlling (coordinating or facilitating) communication between applications in a computer network, in accordance with various embodiments. In some embodiments, system 100 includes a configuration subsystem 112 (e.g., one or more servers or other computer systems), a gateway subsystem 114 (e.g., one or more servers or other computer systems), a metering subsystem 116 (e.g., one or more servers or other computer systems), and an application subsystem 118 (e.g., one or more servers or other computer systems). The application subsystem 118 can host multiple applications (e.g., healthcare related applications), such as a first application 110a (e.g., patient program provider application) and a second application 110b (e.g., patient acuity stratifier application).

System 100 facilitates controlling communication between the applications 110 based on interaction patterns, which define the operations to be performed by one or more applications to reach a common goal. The configuration subsystem 112 can facilitate generation of configuration data 125 that can be used in controlling communication between the applications. The configuration data 125 includes interaction pattern data 126, which defines an interaction pattern in terms of roles, transactions, application programming interfaces (APIs) and their interdependencies. For example, a role is associated with a transaction that is performed with another role using an associated API. A role can be a source of a transaction (e.g., consumer of the API associated with the transaction), or a target of the transaction (e.g., provider of the API associated with the transaction). The configuration data 125 includes application conformance data 127, which defines a set of roles implemented by an application. In some embodiments, the roles implemented by an application can be used to determine which other applications and their associated APIs the application can access. Further, the configuration data 125 includes application instance data 128, which specifies location data of APIs (e.g., uniform resource locator (URL) of an endpoint, such as a server or other computer system, that hosts the API) associated with an instance of an application. In general, the configuration data 125 can be used in determining the allowed interactions between the applications (e.g., which API of an application can invoke which APIs of other applications based on the defined roles).

The configuration subsystem 112 also provides a discovery API to find applications and their associated APIs accessible by an application. An application can use the discovery API to obtain a list of applications and their associated APIs accessible by the application. In some embodiments, the discovery API uses the configuration data 125, such as the roles implemented by the application (e.g., roles implemented by the source application and the target application) and the APIs associated with those roles, to determine the list of applications and their associated APIs accessible by the application.

The configuration subsystem 112 also provides an authorization API, which can be used by the application subsystem 118 for providing an authorization decision if a specific application should accept an incoming request from another application, and if yes, the authorization API can also let the requesting application know which APIs of the specific application are accessible (based on the configuration data 125 such as the roles implemented by the application and the APIs associated with those roles). By the above method, system 100 provides a form of role-based access control, though applied at application level and not on user level.

The gateway subsystem 114 facilitates generation of network route data and setting up a gateway for routing an API access request from a requesting application to the requested API. The gateway subsystem 114 can act as intermediate between applications (e.g., receive an API access request from a requesting application and route it to the appropriate endpoint having the requested API). The gateway subsystem 114 uses the configuration data 125, such as the location data of the APIs to generate the network route data. The gateway subsystem 114 can also add tags (e.g., interaction pattern name, source API, source application, destination application, or destination API) to the network traffic (e.g., application interactions such as API access requests and responses) passing through the gateway subsystem 114, which can be used for metering or other analytics purposes.

The metering subsystem 116 can facilitate collection and aggregation of the metered data, which can be used to generate reports having any of various analytics. As the interactions passing through the gateway subsystem 114 are tagged/classified based on tags, reports depicting different kinds of the interaction pattern knowledge can be generated. Examples of reports include business reports on ecosystem usage, financial reports, operational reports, security reports. These reports can include analytics such as a type of interaction pattern used by an application, a quantity of interactions between a pair of applications, or other such performance metrics associated with an application.

Additional details of system 100 are described at least with reference to FIG. 1B below.

Figure 1B:
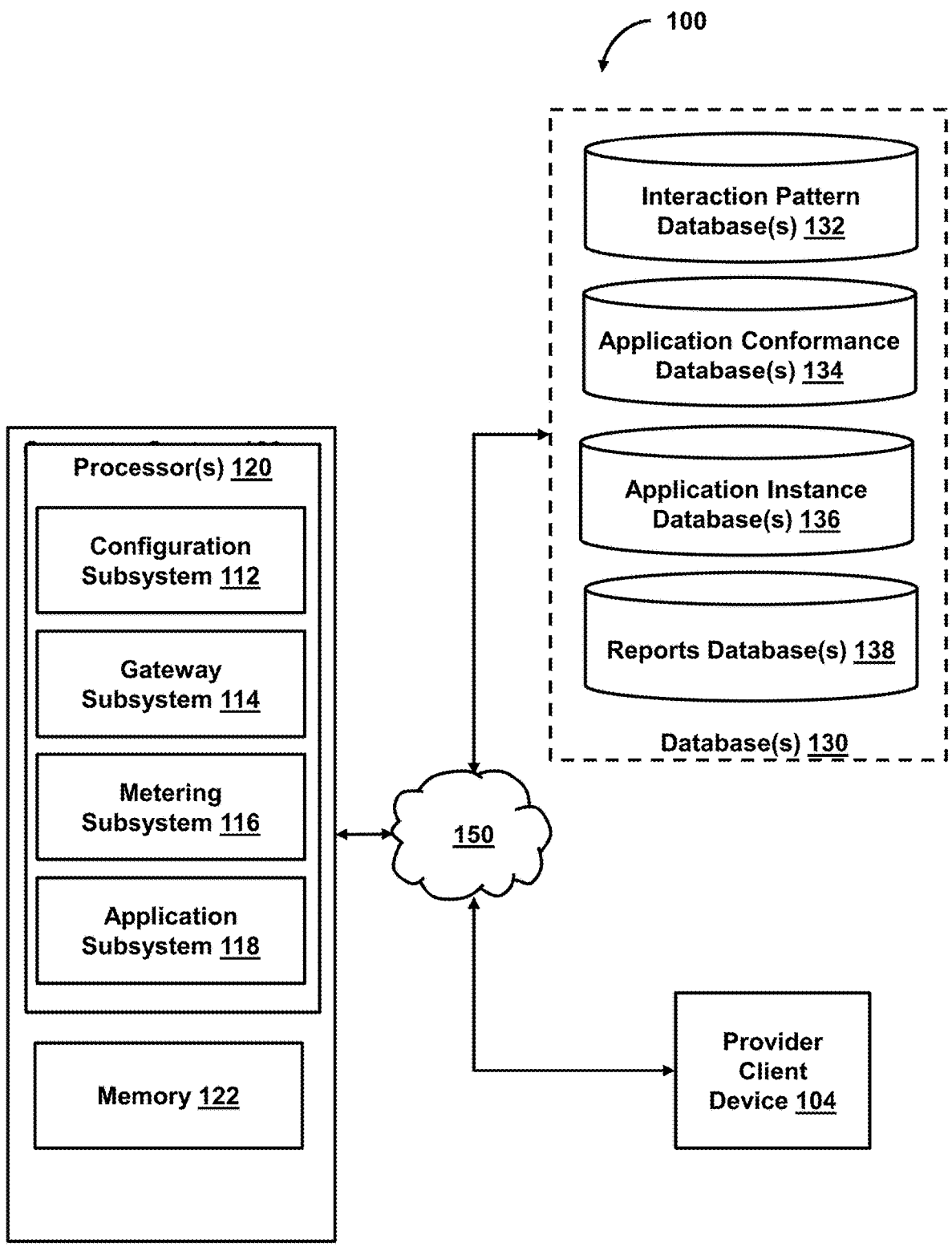

FIG. 1B shows a detailed view of the system 100 for controlling communication between applications in a computer network, in accordance with various embodiments. In some embodiments, system 100 includes a computer system 102 (e.g., one or more servers or other computer systems), a provider client device 104, and databases 130. Although only a single provider client device 104 is illustrated, system 100 may include multiple provider client devices that are the same or similar to provider client device 104. Computer system 102, provider client device 104, and databases 130 are configured to be operatively coupled to one another such that each of computer system 102, provider client device 104, and databases 130 can communicate with one another, or with other components, devices, and systems, via network 150. For example, network 150 is capable of being accessed by any component of system 100 using Transfer Control Protocol and Internet Protocol ("TCP/IP"), User Datagram Protocol (UDP) (e.g., any of the protocols used in each of the TCP/IP layers), Hypertext Transfer Protocol ("HTTP"), WebRTC, SIP, and wireless application protocol ("WAP"). In one embodiment, network 150 facilitates communications between components of system 100 or other components with one another via a web browser using HTTP. Various additional communication protocols used to facilitate communications between components of system 100 include, but are not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Databases 130 include one or more interaction pattern databases 132, one or more application conformance databases 134, one or more application instance databases 136, and one or more reports databases 138. In some embodiments, system 100 includes multiple instances of the databases 130. However, for simplicity, a single instance of each of the database(s) 130 is described. For example, as described herein, "interaction pattern database 134" refers to a single interaction pattern database or multiple interaction pattern databases. Each of the databases included within databases 130 are capable of being distributed databases, cloud-based storage databases, and the like.

The provider client device 104 interacts with the computer system 102 (e.g., for accessing applications hosted by the computer system 102). In some embodiments, provider client device 104 is associated with a provider located at a care facility. As described herein, a care facility includes general hospitals, psychiatric hospitals, or any other health institution, clinic, or community assisted living communities, or any other type of long-term (e.g., overnight) care facility. Also, the provider may be a doctor, nurse, technician, emergency medical provider, social worker, family member. Provider client device 104 may be a wearable device and/or one or more mobile computer devices. In some embodiments, provider client device 104 includes a computing device (e.g., a desktop or laptop computer, a tablet or a smartphone) assigned to a provider, which can execute an application (e.g., one of the applications hosted by the computer system 102). In some embodiments, the provider client device 104 can also be a computing device that can execute a cloud-hosted application (e.g., one of the applications hosted by the computer system 102), such as a care provider application. For example, the care provider application can: receive a notification from computer system 102 indicating the effects of a combination of prescription medications. Furthermore, the care provider application can interface directly (e.g., as an add-on) to an electronic health record (EHR) application (e.g., hosted by the computer system 102) in order to provide notifications regarding prescription medications while a care provider is reviewing EHR records for a patient. Alternatively, the care provider application can interface with reports database 138, which may be used by the EHR application, in order to access medication data from the EHR application.

In some embodiments, computer system 102 includes the configuration subsystem 112, the gateway subsystem 114, the metering subsystem 116, and the application subsystem 118. Furthermore, computer system 102 may include one or more processors 120, memory 122, and/or other components. Memory 122 may include computer program instructions that, when executed by processors 120, effectuate operations to be performed, including causing the functions of any of subsystems 112-118 to be performed. The computer program instructions may refer to machine-readable instructions stored within memory 122 and executable by processors 120 automatically, in response to a request to perform a particular function or functions, or both. The memory 122 may include a tangible program carrier such as a non-transitory computer readable storage medium.

In some embodiments, the application subsystem 118 is configured to host multiple applications (e.g., healthcare related applications), such as a first application 110a (e.g., patient program provider application) and a second application 110b (e.g., patient acuity stratifier application), as described at least with reference to FIG. 1A. The application subsystem 118 can be implemented as one or more servers or other computer systems. Further, the application subsystem 118 can be implemented as a cloud-based platform, which can provide access to one or more of the applications to multiple-tenants (e.g., care facilities). In some embodiments, the application subsystem 118 can host separate instances of the applications for each tenant. For example, a first set of instances of the first and second applications can be hosted for a first care facility (e.g., represented by a provider client device 104) and a second set of instances of the first and second applications can be hosted for a second care facility (e.g., which can be represented by another provider client device similar to the provider client device 104). However, for the sake of simplicity, one set of instances for a single care facility may be described in the disclosed embodiments. Further, some applications can be hosted by one or more servers, or other computer systems, in a computer network of the care facility (e.g., in the same computer network as provider client device 104). The applications may provide one or more APIs, which can be used/accessed/invoked by another application to communicate with (e.g., consume data from, or provide data to) the application.

In some embodiments, the configuration subsystem 112 is configured to generate configuration data 125 that can be used by computer system 102 to control communication between the applications. For example, when the first application 110a being accessed by the provider client device 104 requests access to a specified API of the second application 110b, the computer system 102 can determine whether to permit the first application 110a access the specified API by analyzing the configuration data 125. The configuration data 125 describes interactions performed by the applications in terms of interaction patterns, roles, transactions, APIs, and their interdependencies based on which the computer system 102 can determine how to control the communication between applications.

The configuration subsystem 112 may provide a graphical user interface (GUI) for defining/generating interaction pattern data 126. A user (e.g., an application developer) can use the GUI to generate an interaction pattern. In some embodiments, generating the interaction pattern includes defining a number of roles and configuring a role as a source or a target of a transaction. In some embodiments, a transaction is a communication path between two roles. A transaction can use one or more APIs to perform an operation. Further, if a role is configured as a source of a transaction, then the role is a consumer of an API associated with the transaction. If a role is configured as a target of a transaction, then the role is a provider of an API associated with the transaction. In some embodiments, two roles may communicate with each other if they are associated with a transaction. If one has to enable a first role and a second role to communicate, the first role and the second role may have to be associated with a transaction. As can be appreciated, the transactions can determine which roles can invoke which other roles.

Figure 2:
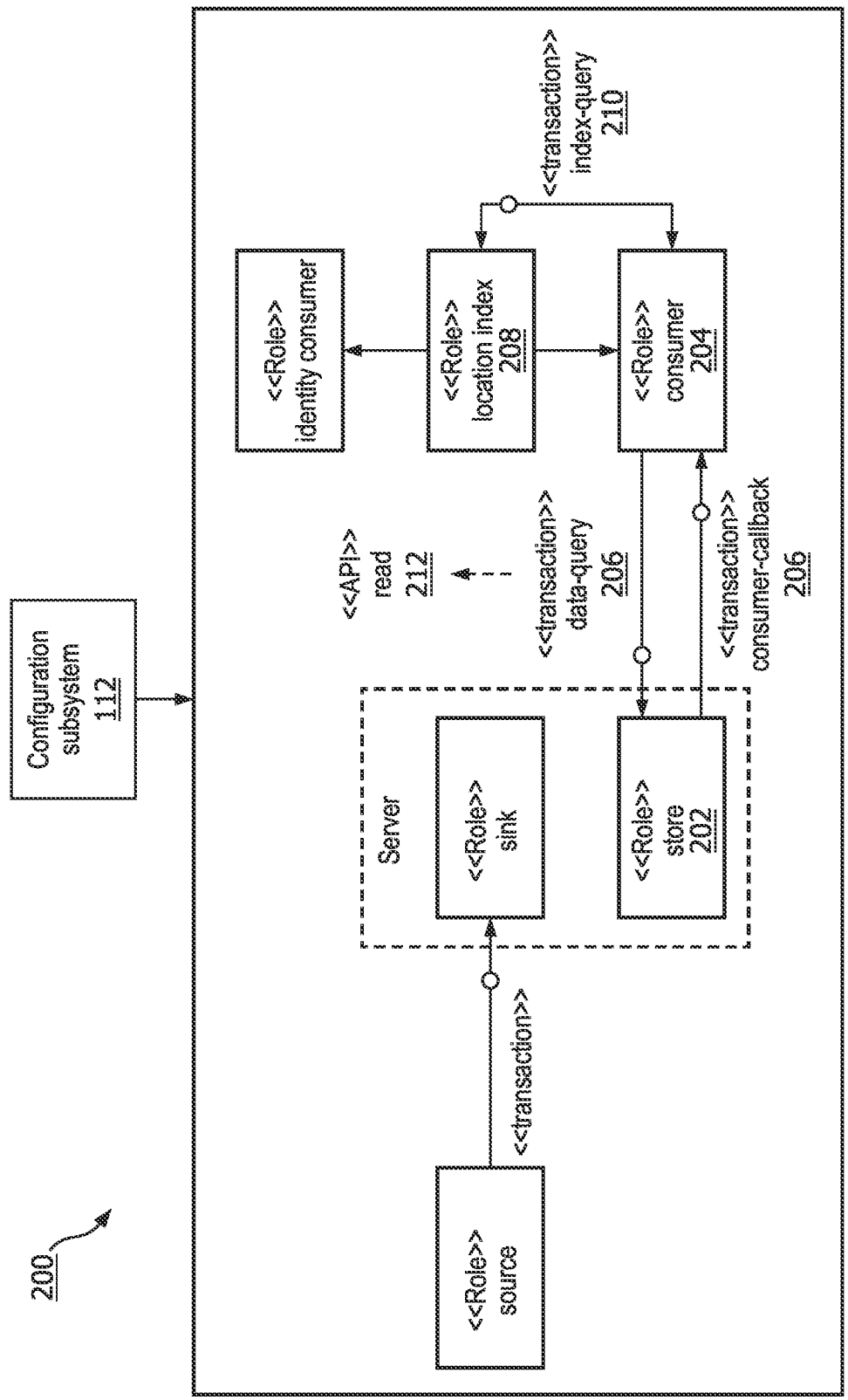
FIG. 2 shows a representation of a patient data exchange interaction pattern, in accordance with various embodiments.

As an example, a patient data exchange interaction pattern 200 is described at least with reference to FIG. 2. In some embodiments, a patient data exchange interaction pattern is an interaction that can be used to exchange patient data between two or more applications. The patient data exchange interaction pattern 200 includes roles such as patient data source, patient data sink, patient data store, patient data consumer, patient data location index, or patient data identity consumer. The roles "patient data store" 202 and "patient data consumer" 204 are connected by/associated with a transaction, "data-query" 206. The role "patient data consumer" 204 is a source of the transaction "data-query" 206, and the role "patient data store" 202 is a target of the transaction "data-query" 206, which means that an application implementing the role "patient data consumer" 204 can invoke an API 212 associated with the transaction "data-query" 206 of an application implementing the role "the patient data store" 202. An example of such an API includes "FHIR-Read", referring to read operations on a Fast Healthcare Interoperability Resources (FHIR) interface, or "DICOM-Web-read" referring to all read operations on a Digital Imaging and Communications in Medicine (DICOM)-web interface.

In some embodiments, an interaction pattern can also include a dependent role, which is a role that is dependent on another role. When a role depends on another role, the dependent role inherits all requirements of the role it depends on, including the provisioning of required APIs. This dependency may be used to extract common functionality into separate roles. As an example, in the patient data exchange interaction pattern 200, the role "location index" 208 is dependent on the role "patient data consumer" 204. The role "location index" 208 and "patient data consumer" 204 are associated with a transaction "index-query" 210, in which the role "patient data consumer" 204 is a source of the transaction 210. In some embodiments, the role "location index" 208 allows the role "patient data consumer" 204 to find which data stores have data about a specific patient. By being dependent on the role "patient data consumer" 204, the role "location index" 208 may also act like the role "patient data consumer" 204 and provide or consume the APIs the role "patient data consumer" 204 provide or consume. The role "location index" 208 may query one or more data stores, like the role "patient data consumer" 204, and then build an index of the data stores, which can then be queried/consumed by role "patient data consumer" 204.

The configuration subsystem 112 can store interaction pattern data 126 (which includes information regarding the interaction pattern, roles, transactions and APIs), in a registry or a database, such as the interaction pattern database 134. In some embodiments, once the interaction pattern is stored in the interaction pattern database 134, the interaction pattern may be considered to be "registered," which means that the interaction pattern (e.g., its roles and transactions) is available to be implemented by the applications. A user (e.g., an application developer) may use the interaction patterns stored in the interaction pattern database 134 to configure the applications to implement one or more roles, which in effect controls integration or communication between applications.

In some embodiments, the configuration subsystem 112 also provides a GUI for generating application conformance data 127. The application conformance data 127 describes a set of roles implemented by an application. In some embodiments, configuring an application to implement a role can enable the application to consume (e.g., invoke) one or more APIs offered by other applications, or provide one or more APIs for consumption by other applications. As an example, to enable a first application to invoke a specified API of a second application, the interaction pattern database 132 may be searched to identify an interaction pattern that has a first role and a second role which are a source and target, respectively, of a transaction performed using the specified API. The first application may then be configured to implement the first role and the second application to implement the second role.

Figure 3:
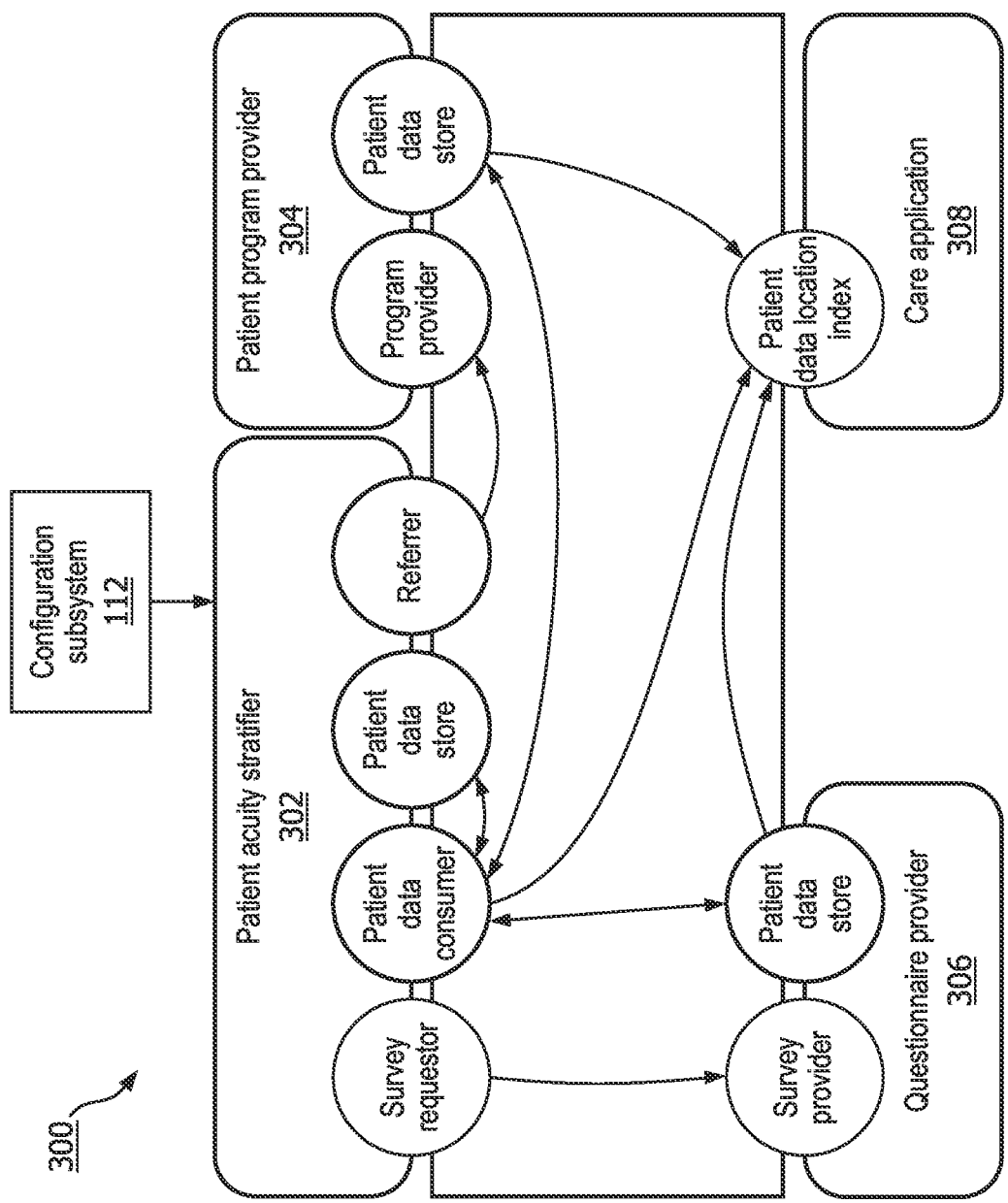
FIG. 3 shows a representation of applications configured to implement roles from various interaction patterns, in accordance with various embodiments.

As an example, FIG. 3 shows a GUI 300 displaying various applications and the roles implemented by the applications. The configuration subsystem 112 makes available all registered interaction patterns, that is, interaction pattern data 126 from the interaction pattern database 132, to the user (e.g., an application developer) for configuring the applications to implement one or more roles. The user may choose one or more of those roles for defining the application interactions accordingly. The GUI 300 of FIG. 3, shows the applications patient acuity stratifier 302, patient program provider 304, questionnaire provider 306, and care application 308 configured to implement roles from various interaction patterns. However, for the sake of simplicity, the following paragraphs describe the configuration of the applications with respect to roles from the patient data exchange interaction pattern 200.

The application patient acuity stratifier 302 is configured to implement roles "patient data store" 202 and "patient data consumer" 204 from the patient data exchange interaction pattern 200; the application patient program provider 304 is configured to implement the role "patient data store" 202; the application questionnaire provider 306 is configured to implement the role "patient data store" 202; and the care application 308 is configured to implement the role "patient data location index" 208.

The above application conformance data 127 can mean the following in terms of the application interaction: (a) application patient acuity stratifier 302 can invoke the APIs of the application patient acuity stratifier 302, patient program provider 304 and questionnaire provider 306 provided by the role "patient data store" 202 implemented by the applications; and (b) application patient acuity stratifier 302 can invoke the APIs of the care application 308 provided by the role "location index" 208 implemented by the care application 308; and (c) the care application 308 can invoke the APIs the application patient acuity stratifier 302 can invoke, as the role "location index" 208 implemented by the care application 308 is dependent on the role "patient data consumer" 204 implemented by the application patient acuity stratifier 302.

While not discussed in detail, the application patient acuity stratifier 302 is also configured to implement roles from other interaction patterns, such as a survey requester role from a survey interaction pattern and a referrer role from a patient referral interaction pattern. Similarly, the application patient program provider 304 is configured to implement roles from other interaction patterns, such as a "program provider" role from a patient referral interaction pattern. Similarly, the application questionnaire provider 306 is configured to implement roles from other interaction patterns, such as a "survey provider" role from the survey interaction pattern.

Note that the GUI 300 also shows the association between the roles via the use of arrows, which depict a transaction the roles are associated with. For example, the "patient data consumer" 204 in the application patient acuity stratifier 302 is connected with roles "patient data store" 202 implemented by the applications patient acuity stratifier 302, patient program provider 304 and questionnaire provider 306, which indicates that the patient acuity stratifier 302 can communicate with patient program provider 304 and questionnaire provider 306 via the APIs associated with transactions connecting these roles. However, a user may not have to associate these roles with the transactions while defining the application interactions as the associations of transactions and roles are defined as part of the interaction patterns.

After the application interaction is defined, application conformance data 127 (which includes information regarding the application and the roles implemented by the application) is stored in the application conformance database 134. The application conformance database 134 stores a list of applications that have been configured to implement one or more roles. In some embodiments, the application conformance database 134 acts as a "market-place," where users (e.g., application developers) may search for compatible applications and their capabilities to integrate with other applications (e.g., based on roles implemented by the applications).

Figure 4:
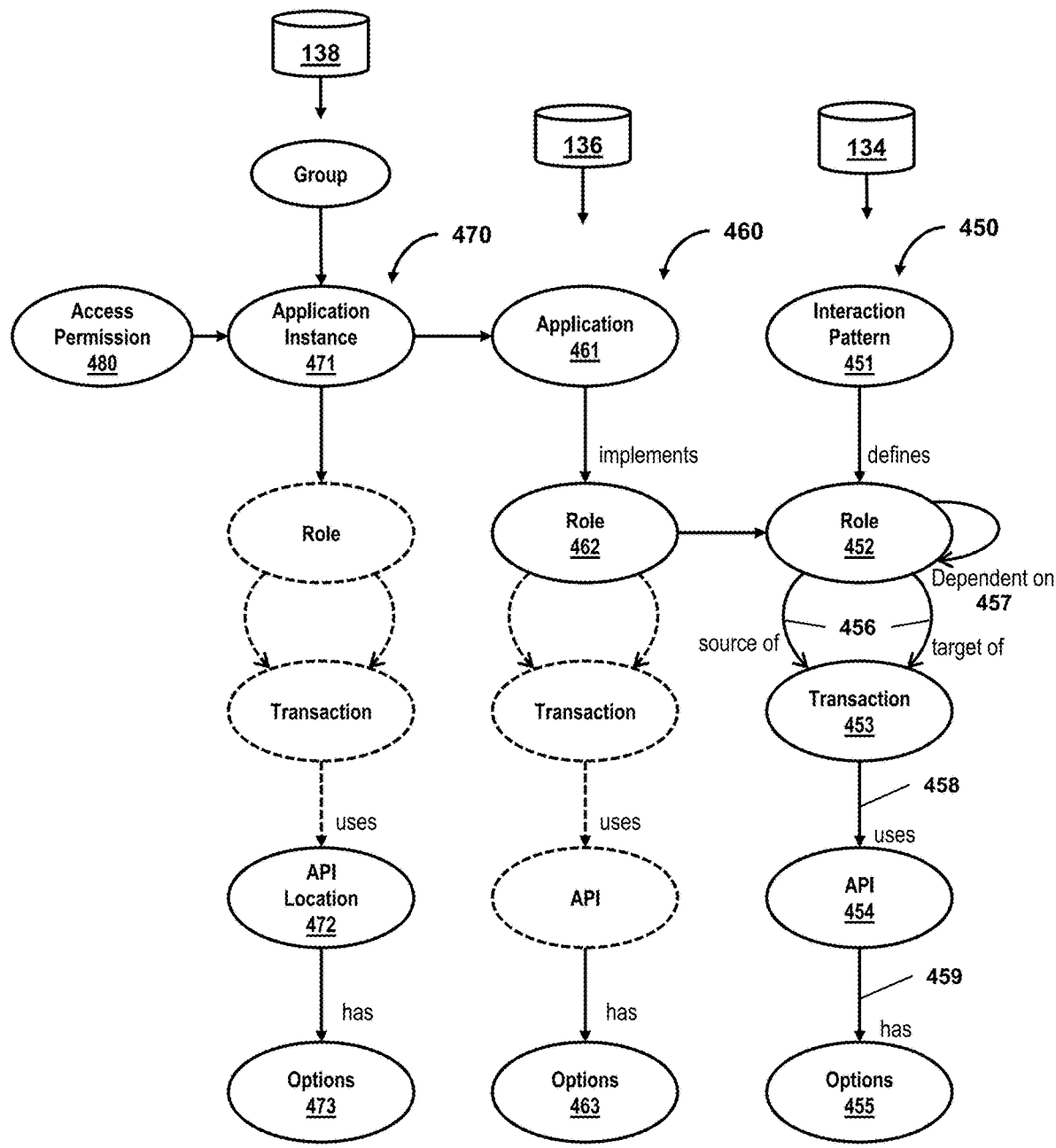
FIG. 4 shows data structures used for generating configuration data, in accordance with various embodiments.

In some embodiments, the configuration subsystem 112 stores the configuration data 125 using one or more data structures. FIG. 4 shows data structures used for defining/generating/storing configuration data 125, including interaction pattern data 126, application conformance data 127 and application instance data 128. As an example, interaction pattern data 126 is stored in the interaction pattern database 134 using a first data structure 450. In some embodiments, a data structure includes a number of attributes and relationships that define the data stored using the data structure. The first data structure 450 includes an interaction pattern attribute 451, which can specify a name or identification (ID) and version or other information associated with the interaction pattern. The role attribute 452 specifies a name or ID of the role implemented by the interaction pattern. Many such roles may be defined for an interaction pattern. The transaction attribute 453 specifies a name or ID of the transaction. The API attribute 454 specifies a name and version of the API. In some embodiments, the API names are unique across the applications. The options attribute 455 defines one or more features of the API that can be enabled or disabled. As an example, one of the options can be "sensitive," which enables the API to retrieve what is categorized as sensitive data or personal data associated with a patient, which would not be retrieved if the option is not set to "sensitive." Further, specifying the options for the API may be optional.

The relationship attributes define relationship between various attributes. As an example, role-transaction relationship attribute 456 define a relationship between a role and transaction. For example, the role can be a source or target of the associated transaction. The role-dependency attribute 457 of a role specifies another role from which the role depends. The transaction-API attribute 458 specifies one or more APIs used for executing the transaction. The API-option attribute 459 specifies one or more options associated with an API.

In some embodiments, application conformance data 127 is stored in the application conformance database 134 using a second data structure 460. The second data structure 460 includes an application attribute 461, which can specify a name or identification (ID) or other information associated with the application. The role attribute 462 specifies a name of the role implemented/supported by the application. Many such roles may be implemented by the application. The options attribute 463 defines one or more features of the application that can be enabled for interaction with other applications. Further, specifying the options for the API may be optional.

In some embodiments, application instance data 128 is stored in the application instance database 136 using a third data structure 470. The third data structure 470 includes an application instance attribute 471, which can specify an ID or other information of the application instance. As mentioned earlier, in some embodiments, an application instance is a logical instance of an application and may refer to an independent customer deployment of an application as well as to a configured tenant at a shared deployment of that application. For example, if an application is deployed for two care facilities, there may be two separate instances of the application. The application instance associated with a first care facility may have a first instance ID and the application instance associated with a second care facility may have a second instance ID. The API location attribute 472 specifies location data (e.g., IP address, URL or other such network address of an endpoint) where an API of the application instance is located. The options attribute 473 defines one or more features of the application that can be enabled for interaction with other applications. For example, the options attribute can be used to define whether a role implemented by the application is enabled or disabled for a specific instance of the application. Further, specifying the options for the API may be optional. In some embodiments, application instances associated with a particular customer are also tagged with a group ID and typically, application instances are allowed communicate with other application instances with the same group ID.

The access permissions data 480 define access permissions for an application. For example, the access permissions data 480 define a list of applications that can access a first application, regardless or independent of the roles implemented by the first application. In another example, the access permissions data 480 define a group of applications that can be accessed by a first application. In still another example, the access permissions data 480 define whether a first application can access a specific role of a second application, regardless or independent of whether first application and the second application implement roles that are associated with a transaction in which the first application is a source and the second application is a target of the transaction.

In some embodiments, controlling the communication can include discovering a list of APIs an application can invoke, determining whether an application can invoke a specified API, or authorizing a server to accept an incoming API access request from a client device. The configuration subsystem 112 performs a configuration analysis to determine how to control the communication between applications. For example, as part of the configuration analysis, the configuration subsystem 112 can determine based on the presence of an instance of the first application 110*a* in the application instance database 136, that the first application 110*a* is registered in the application conformance database 134 as providing some integration capabilities. Next, from the application conformance database 134 and using the second data structure 460, the configuration subsystem 112 can determine that the first application 110*a* is implementing a set of roles from the interaction pattern database 132. Next, from the interaction pattern database 134 and using the first data structure 450, the configuration subsystem 112 can determine a first subset of roles which are sources of transactions, and determine the APIs associated with these transactions as the APIs invocable by the first application 110*a*. Similarly, the configuration subsystem 112 can determine a second subset of roles which are targets of transactions, and determine the APIs associated with these transactions as the APIs to be implemented by the first application 110*a* for consumption by other applications.

In some embodiments, a user (e.g., application developer) may configure one or more endpoints to host the APIs by the second subset of roles and update the location data of these APIs in the application instance data 128 accordingly (e.g., in the API location attribute 472 in the third data structure 470 for an instance associated with the first application 110*a*).

In another example, performing configuration analysis to determine that an instance of the first application 110*a* can access a specified API associated with the second application 110*b* can include determining that (a) an instance of the first application 110*a* is permitted to communicate with an instance of the second application 110*b* based on the access permissions data 480; (b) the first application 110*a* is implementing a first role and the second application 110*b* is implementing a second role based on the application conformance data 127; (c) the first role is enabled for the instance of the first application 110*a*, and the second role is enabled for the instance of the second application 110*b* based on the application instance data 128; (d) a transaction is defined between the first role and the second role, where the first role is the source of the transaction and the second role is the target of the transaction based on the interaction pattern data 126; and (e) the transaction is defined to use the API based on the interaction pattern data 126.

The configuration subsystem 112 may provide a discovery API, which can be used by an application to determine the APIs that can be invoked by the application. In the process of discovery can involve multiple operations. As an example, in a first operation, a first application 110*a* being executed by the provider client device 104 can request the computer system 102 to provide a list of APIs accessible by the first application 110*a*. The computer system 102 can return a first response having location details of an endpoint (e.g., a server or other computer system) hosting the discovery API. In some embodiments, the first response could include the following details:

```
{
   ...
   authorization_endpoint: "https://iam.hsdp...."
   token_endpoint: "https://iam.hsdp.ph.com/..."
   ...
   introspect_endpoint: "https://cce.ph.com/.../introspect"
   discovery_endpoint: https://cce.ph.com/...
}
```

The authorization endpoint is an endpoint where the provider client device 104 can authenticate itself to the computer system 102 and obtain an access token from the token endpoint after successful authentication. The discovery endpoint specifies location of the endpoint which hosts the discover API.

In the second operations of the discovery process, the provider client device 104 can send a request to the discovery endpoint for invoking the discovery API. The provider client device 104 can also provide the access token in the request. The discovery endpoint processes the access token to confirm that the provider client device 104 is allowed to invoke the discovery API and returns a second response to the provider client device 104. The second response can include a list of APIs accessible (e.g., invocable) by the first application 110*a* and also the APIs to be implemented (e.g., provided) by the first application 110*a*. In some embodiments, the second response can include a discovery document with the following information:

```
{
   ...
   self: {
      application_id: "1234-23-23-4235"
      apis: [{
      }]
      ...
   }
   applications: [{
      application_id: "1234-23-23-4235"
      name: "human readable name of the application"
      description: "human readable description of service"
      apis: [{
         pattern: PDX
         role: Store
         transaction: fhir-query
            api: fhir-read
            base_url: https://cce.ph.com/1234-23-23-4235/fhir/
               options: ["sensitive" ]
      }]
   }]
   exp: 59874327
}
```

In some embodiments, the self-section of the second response indicates (a) the APIs the first application 110*a* is configured to provide/publish/implement for consumption by other applications, and (b) location data of the endpoint these APIs are accessible at.

The application section of the second response provides a list of applications (e.g., "application_id") and their associated APIs (e.g., "api") that may be invoked by the first application 110a. The application section also includes the location data (e.g., "base_URL") of the endpoints where the APIs are hosted by the corresponding applications. In some embodiments, the APIs are tagged with the IDs of the associated interaction pattern, role and transaction (e.g., which are obtained from the data structures described above).

Further, the second response also includes a validity indicator (e.g., "exp"), which indicates an expiry date or time of the details provided in the second response. After the expiry, the provider client device 104 may have to invoke the discovery API again to obtain a new list of APIs, which may or may not have changed from the previously obtained list of APIs. In some embodiments, the provider client device 104 may cache the list of APIs in a memory associated with the provider client device 104 and refer to cached list rather than invoking the discovery API, thereby saving computing or networking resources. However, after the expiry of the cached list of APIs, the provider client device 104 may have to invoke the discovery API to obtain a new list of APIs.

In some embodiments, the discovery API can determine the above list of APIs invocable by the first application 110a based on the configuration analysis described above (e.g., analysis of the configuration data 125 using the three data structures 450, 460 and 470). After obtaining the list of APIs from the discovery API, the first application 110a executing at the provider client device 104 can select a specified API from the list of APIs, and send a request to a specified endpoint hosting the specified API associated with a second application 110b for accessing the specified API.

When the specified endpoint receives a request from the provider client device 104 for accessing the specified API, the specified endpoint performs a check to determine whether the first application 110a is authorized to access the second application hosted by the server endpoint and whether the first application 110a is authorized to access the specified API of the second application. In some embodiments, the configuration subsystem 112 provides an authorization API, which the specified endpoint can use to determine the authorization. For example, upon receiving the API access request from the first application 110a executing at the provider client device 104, the specified endpoint invokes the authorization API at an authorization endpoint with a pair of access tokens, one associated with the specified endpoint and another received from the provider client device 104 (e.g., as described above at least with reference to discovery API). The authorization API processes the access tokens to determine that an instance of the first application 110a is requesting to invoke an instance of the second application. The authorization API then determines whether an instance of the first application 110a is permitted to invoke an instance of the second application 110b using the access permissions data 480. If the access permissions data 480 indicates that the first application 110a is not allowed to access the second application 110b, the authorization API returns a response to the specified endpoint indicating so, and the specified endpoint can further notify the provider client device 104 that it is restricted from accessing the second application. However, if the access permissions data 480 indicates that the first application 110a is allowed to access the second application 110b, the authorization API returns a response to the specified endpoint indicating a list of APIs the first application 110a is allowed to access. In some embodiments, the response from the authorization API can include the following information:

```
{
    active: true
    scope: ['fhir-read', 'fhir-read-sensitive']
    client_id: '1234-56-7980'
    group_id: 'id x'
    exp: 59874327
}
```

In some embodiments, the "active" attribute indicates if the API access request should be allowed by the specified endpoint. The "scope" attribute indicates the list of APIs the first application is allowed to access at the specified endpoint. The "client_id" is the unique identifier of the requesting application (e.g., first application 110a). The "group_id" attribute indicates a deployment group of the interaction. As described above, in some embodiments, instances are allowed to communicate with other instances within the same group ID. In some embodiments, a group ID indicates a tenant ID in multi-tenant cloud platform, which can be representative of a deployment for a particular entity (e.g., a care facility). The cloud platform can support deployment of the applications for multiple tenants and each tenant may have a unique group ID and instances of the application for each tenant is grouped under the corresponding group ID. The validity indicator "exp" indicates a time value until which the response is valid (and therefore, the time until which the response may be cached at the server endpoint to prevent making subsequent calls to the authorization API).

After the specified endpoint receives the authorization response from the authorization endpoint, the specified endpoint can determine whether the specified API requested by the first application 110a is included in the list of APIs from the authorization response, and if it is included, permit the first application 110a to access the specified API.

In some embodiments, the authorization API, like the discovery API, can determine the list of APIs accessible by the first application 110a, based on the configuration analysis described above (e.g., analysis of the configuration data 125 using the three data structures 450, 460 and 470).

In some embodiments, the gateway subsystem 114 facilitates generation of network route data and routing an API access request from a requesting application to the requested API based on the network route data. The gateway subsystem 114 analyzes the configuration data 125 (e.g., performs a configuration analysis as described above) to determine the list of APIs an application can invoke, location data of the APIs (e.g., URLs of the endpoints hosting the APIs) and generate the network route data accordingly. A gateway is then configured with the network route data to route the access requests accordingly. For example, when the provider client device 104 accesses a specified API located at a specified endpoint indicated in the discovery document, the discovery endpoint notifies the provider client device 104 to direct request to the gateway subsystem 114, which then routes the access request to the specified endpoint based on the network route data. In some embodiments, the discovery API may replace an URL of the specified API in the discovery document with an URL of an instance of the gateway that can route a request from the provider client device 104 to the specified API at the specified endpoint. So, when the provider client device 104 accesses the URL of the gateway, the gateway may route an API access request to the specified endpoint. The gateway subsystem 114 can be configured using various methods. In some embodiments, the gateway subsystem 114 is configured using Envoy Proxy configuration APIs.

In some embodiments, in a multi-cloud platform setup, a network of gateways may be configured. For example, if one application is in one network zone (e.g., off-premise cloud infrastructure such as outside of a computer network of a care facility) and another application is in a second network zone (e.g., on-premise cloud infrastructure such as within the computer network of a care facility), a gateway may be placed at edge of the each network zone (e.g., one in the on-premise cloud infrastructure and another one outside the on-premise cloud infrastructure). The gateways are then configured to route external traffic to internal services, and vice-versa route requests from internal services through other proxies to relevant services located elsewhere. In some embodiments, to enable such routing of requests across network zones, applications may have to be tagged with the network zone ID in which they are placed. The gateway subsystem 114 may then generate network route data based on the network zones.

Further, in some embodiments, since the gateway subsystem 114 has access to the configuration data 125, the gateway subsystem 114 can determine the interaction patterns, server endpoints, requesting applications, destination applications/APIs associated with the network traffic passing through the gateway subsystem 114. The gateway subsystem 114 can add tags (e.g., interaction pattern name, source API, source application, destination application, destination API, server endpoints, or other information) to the network traffic (e.g., application interactions such as API access requests and responses) passing through the gateway subsystem 114 and generate tagged access logs. The gateway subsystem 114 can store the tagged access logs in a reports database 138.

As an example, the metering subsystem 116 can analyze the tagged access logs to generate reports having any of various analytics. Examples of reports include usage reports that describe, for example, how many interactions of a certain interaction pattern type have taken place (e.g. patient data exchange). The reports can further be categorized based on various parameters, such as requesting application and requested application. Reports can also include financial data such as how many interactions have taken place with a specific endpoint, which can be used for pay-per-use type financial models. Reports can also include operational data such as client and server performance indicators, including availability rates, response times, etc. Reports can also include security information, such as information regarding failed requests (e.g., for security reasons/unauthorized requests), unexpected interactions, or a behavior change, which are useful in detecting security breaches.

As can be appreciated, various services are accomplished using the configuration data 125, including discovery service, authorization service, routing of API access requests, and metering/reporting service.

Example Flowcharts

FIGS. 5-8 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

Figure 5:
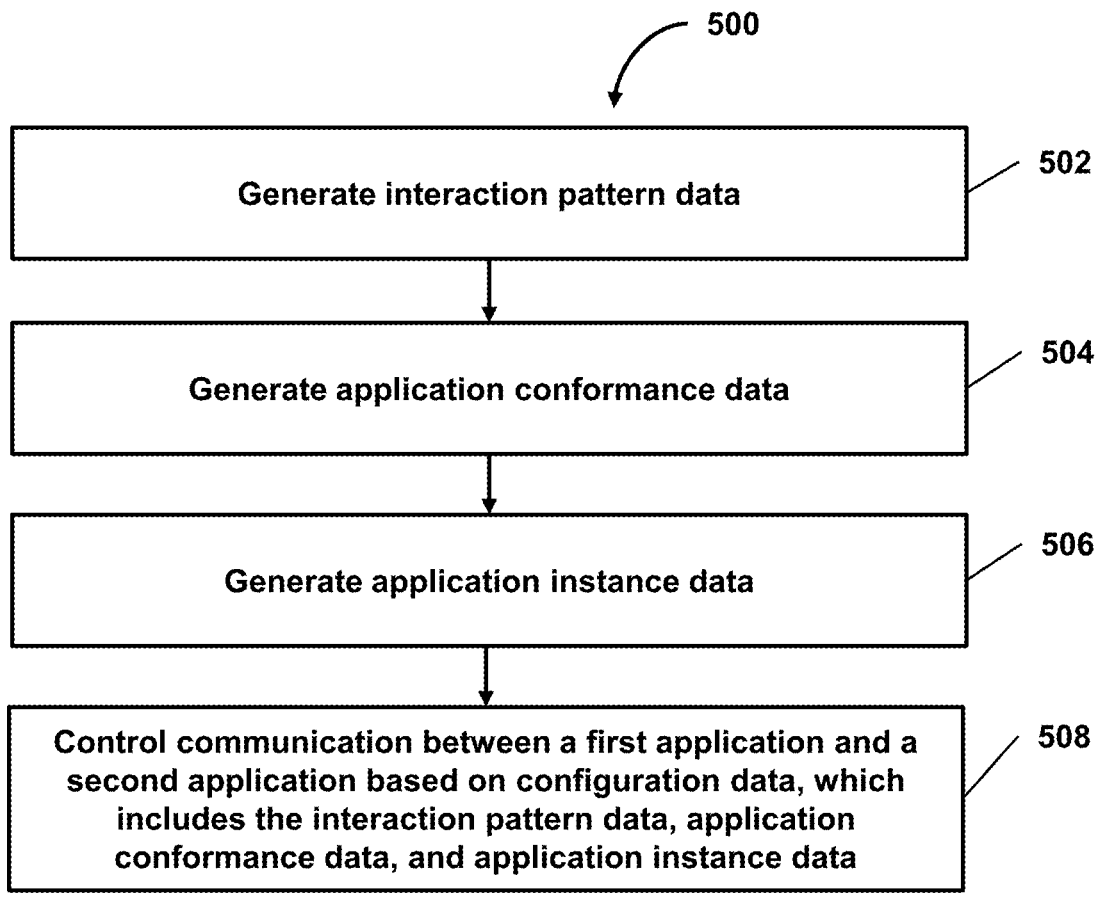
FIG. 5 shows a flowchart of method for controlling communication between applications, in accordance with various embodiments.

FIG. 5 shows a flowchart of method 500 for controlling communication between applications, in accordance with various embodiments. In an operation 502, interaction pattern data is generated. As an example, generating the interaction pattern data may include defining a number of roles of an interaction pattern and configuring a role as a source or a target of a transaction. In some embodiments, a transaction is performed using one or more APIs. If a role is configured as a source of a transaction, then the role is a consumer of an API associated with the transaction. If a role is configured as a target of a transaction, then the role is a provider of an API associated with the transaction. In some embodiments, two roles may communicate with each other if they are associated with a transaction. For example, if a first role is to be configured to communicate with a second role, the first role and the second role may have to be associated with a transaction. An example of the interaction pattern is described at least with reference to FIG. 2. In some embodiments, operation 502 is performed by a subsystem that is the same or similar to the configuration subsystem 112, application subsystem 118, or a combination thereof.

In an operation 504, application conformance data is generated. As an example, generating the application conformance data includes configuring an application to implement a set of roles. In some embodiments, configuring an application to implement a role can enable the application to consume (e.g., invoke) one or more APIs offered by other applications, or provide one or more APIs for consumption by other applications. For example, to enable a first application to invoke a specified API of a second application, an interaction pattern that has a first role and a second role as a source and target, respectively, of a transaction performed using the specified API is identified (e.g., from interaction pattern database), and the first application may be configured to implement the first role and the second application to implement the second role. An example of generating application interaction is described at least with reference to FIG. 3. In some embodiments, operation 504 is performed by a subsystem that is the same or similar to the configuration subsystem 112, application subsystem 118, or a combination thereof.

In an operation 506, application instance data is generated. As an example, generating the application instance data includes associating an application instance with location data of the APIs provided by the application. As an example, location data can include IP address, URL or other such network address of an endpoint where an API of the application instance is hosted/located. In some embodiments, generating the application instance data may also include generating accession permissions data, which defines which application instances are permitted to access which application instances. In some embodiments, operation 506 is performed by a subsystem that is the same or similar to the configuration subsystem 112, application subsystem 118, or a combination thereof.

In an operation 508, communication between applications is controlled based on the configuration data, which includes the interaction pattern data, application conformance data and the application instance data. Examples of controlling the communication between applications can include discovering a list of APIs an application can invoke, determining whether an application can invoke a specified API, or authorizing a server to accept an incoming API access request from a client device some of which are described at least with respect to FIGS. 6-8 below. In some embodiments, operation 508 is performed by a subsystem that is the same or similar to the configuration subsystem 112, gateway subsystem 114, application subsystem 118, or a combination thereof.

Figure 6:
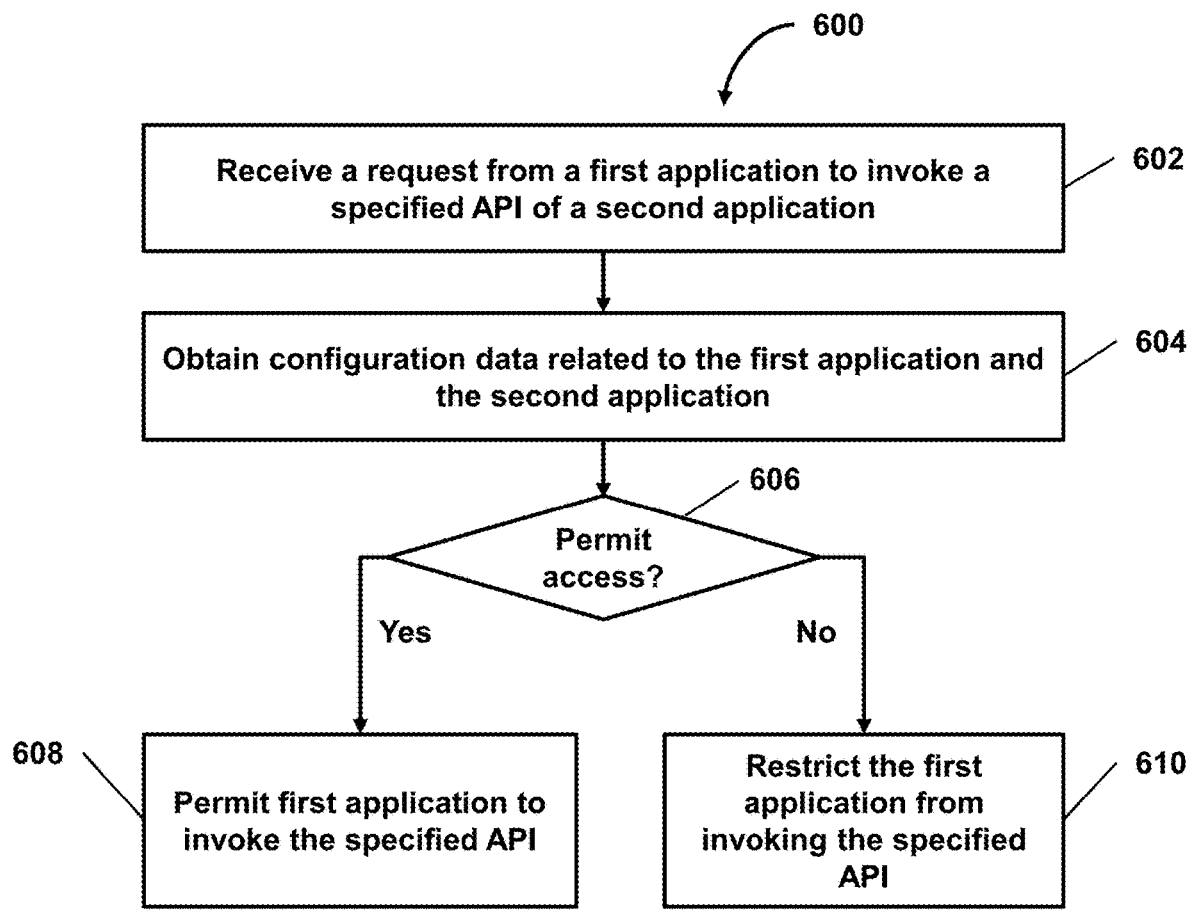
FIG. 6 shows a flowchart of method for controlling communication between a first application and a second application, in accordance with various embodiments.

FIG. 6 shows a flowchart of method 600 for controlling communication between a first application and a second application, in accordance with various embodiments. In an operation 602, a request is received from a first application to invoke a specified API of a second application. As an example, the request can be received by a specified endpoint (e.g., server or other computer system in the application subsystem 118) that hosts the specified API. In some embodiments, the first application finds the specified endpoint hosting the specified API based on a discovery document obtained from a discovery endpoint (which is described at least with reference to FIG. 7 below). In some embodiments, operation 602 is performed by a subsystem that is the same or similar to the configuration subsystem 112, gateway subsystem 114, application subsystem 118, or a combination thereof.

In an operation 604, the configuration data associated with the first application and the second application is obtained. For example, the interaction pattern data and application conformance data are obtained from databases 130. As described above, the interaction pattern data can define an interaction using roles, transactions and APIs. A role can consume an API from another role, or provide the API to another role. In some embodiments, operation 604 can be performed by an authorization endpoint (e.g., server or other computer system in the configuration subsystem 112, and as described at least with reference to FIG. 8 below). Also as described above, the application conformance data describes a set of roles implemented by the application. In some embodiments, operation 602 is performed by a subsystem that is the same or similar to the configuration subsystem 112, gateway subsystem 114, application subsystem 118, or a combination thereof.

In an operation 606, a determination is made whether to permit the first application to invoke the specified API of the second application, based on the configuration data. In some embodiments, a configuration analysis (which involves analyzing the configuration data 125 as described above) may be performed to determine whether the first application is allowed to invoke the specified API of the second application. In some embodiments, at least a portion of the operation 606 can be performed by the authorization endpoint. As an example, if the application conformance data indicates that the first application is configured to implement a first role and the second application is configured to implement a second role, and the interaction pattern data indicates that the first role is configured to consume the specified API associated with the second role, then a determination is made to permit the first application to invoke the specified API. Accordingly, in an operation 608, the first application is permitted to invoke the specified API. However, if the configuration data indicates that either the first application does not implement a first role or the second application does not implement a second role, then a determination is made that the first application is not permitted to invoke the specified API. Accordingly, in an operation 610, the first application is restricted from invoking the specified API. In some embodiments, the first application may also be notified of the reason why it is not permitted to invoke the specified API. In some embodiments, operations 608-610 is performed by a subsystem that is the same or similar to the configuration subsystem 112, gateway subsystem 114, application subsystem 118, or a combination thereof.

Figure 7:
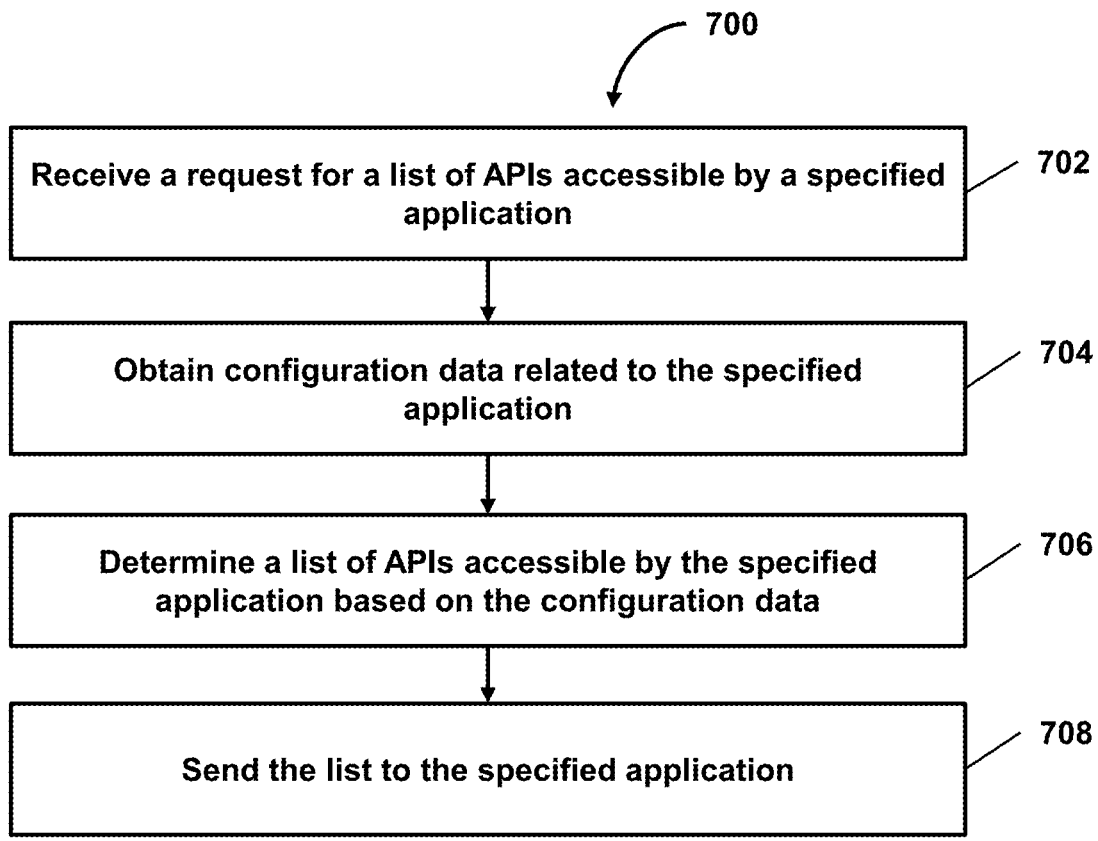
FIG. 7 shows a flowchart of method for performing a discovery process, in accordance with various embodiments.

FIG. 7 shows a flowchart of method 700 for performing a discovery process, in accordance with various embodiments. In some embodiments, the method 700 is performed using a discovery API of a discovery endpoint (e.g., a server or other computer system in configuration subsystem 112). In an operation 702, a request is received from a specified application for a list of APIs accessible by the specified application.

In an operation 704, configuration data associated with the specified application is obtained. As an example, the configuration data can include the interaction pattern data, application conformance data and the application instance data. The configuration data can be obtained from the databases 130.

In an operation 706, a determination is made regarding a list of APIs that are accessible by the specified application. In some embodiments, a configuration analysis (which involves analyzing the configuration data 125 as described above) may be performed to determine a list of APIs the specified application is allowed to invoke. As an example, (a) a set of roles implemented by the specified application is determined based on the application conformance data, (b) a subset of roles that are configured as a source of one or more transactions and APIs associated with those transactions are determined based on the interaction pattern data, and (c) location data associated with each of the APIs (e.g., URLs of the endpoints where the APIs are hosted) is determined from the application instance data.

In an operation 708, a discovery document having the list of APIs and other information (e.g., applications associated with the APIs, location data, or validity indicator) is returned to the specified application.

Figure 8:
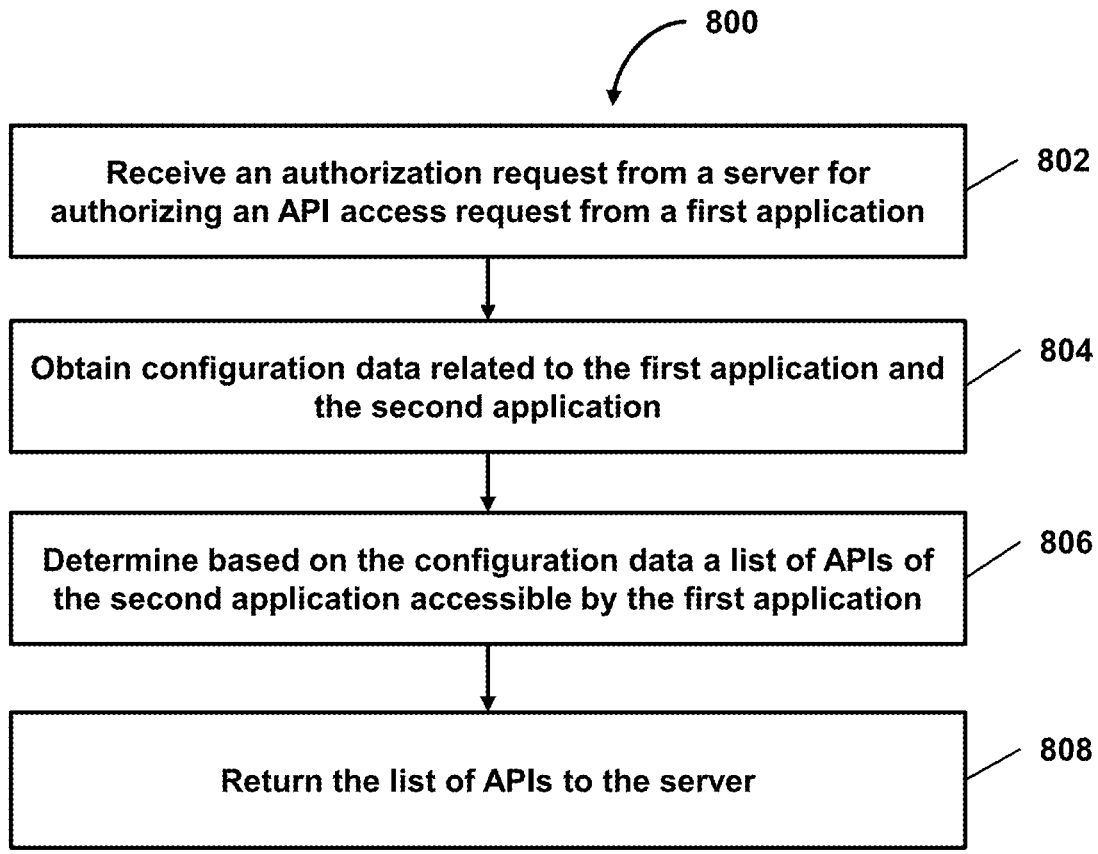
FIG. 8 shows a flowchart of method for performing an authorization process, in accordance with various embodiments.

FIG. 8 shows a flowchart of method 800 for performing an authorization process, in accordance with various embodiments. In some embodiments, the method 800 is performed using an authorization API of an authorization endpoint (e.g., a server or other computer system in the configuration subsystem 112). In some embodiments, the method 800 In an operation 802, an authorization request is received from a specified endpoint for authorizing an access request from a first application. In some embodiments, the access request is for accessing a specified API of a second application hosted by the specified endpoint.

In an operation 804, configuration data associated with the first application is obtained. As an example, the configuration data can include the interaction pattern data, application conformance data and the application instance data. The configuration data can be obtained from the databases 130.

In an operation 806, a determination is made regarding a list of APIs accessible by the first application. In some embodiments, a configuration analysis (which involves analyzing the configuration data 125 as described above) may be performed to determine a list of APIs the first application is allowed to invoke. As an example, (a) a set of roles implemented by the first application is determined based on the application conformance data, (b) a subset of roles that are configured as a source of one or more transactions and the APIs associated with those transactions are determined based on the interaction pattern data, and (c) a subset of those APIs that are hosted by the specified endpoint is determined from the application instance data.

In an operation 808, a list of APIs on the specified endpoint that are accessible by the first application is sent to the specified endpoint. In some embodiments, upon receiving the list of APIs from the authorization endpoint, the specified endpoint can then check whether the specified API requested by the first application is in the list of APIs. If the specified API is in the list, the specified endpoint can permit the first application to access the specified API.

Figure 9:
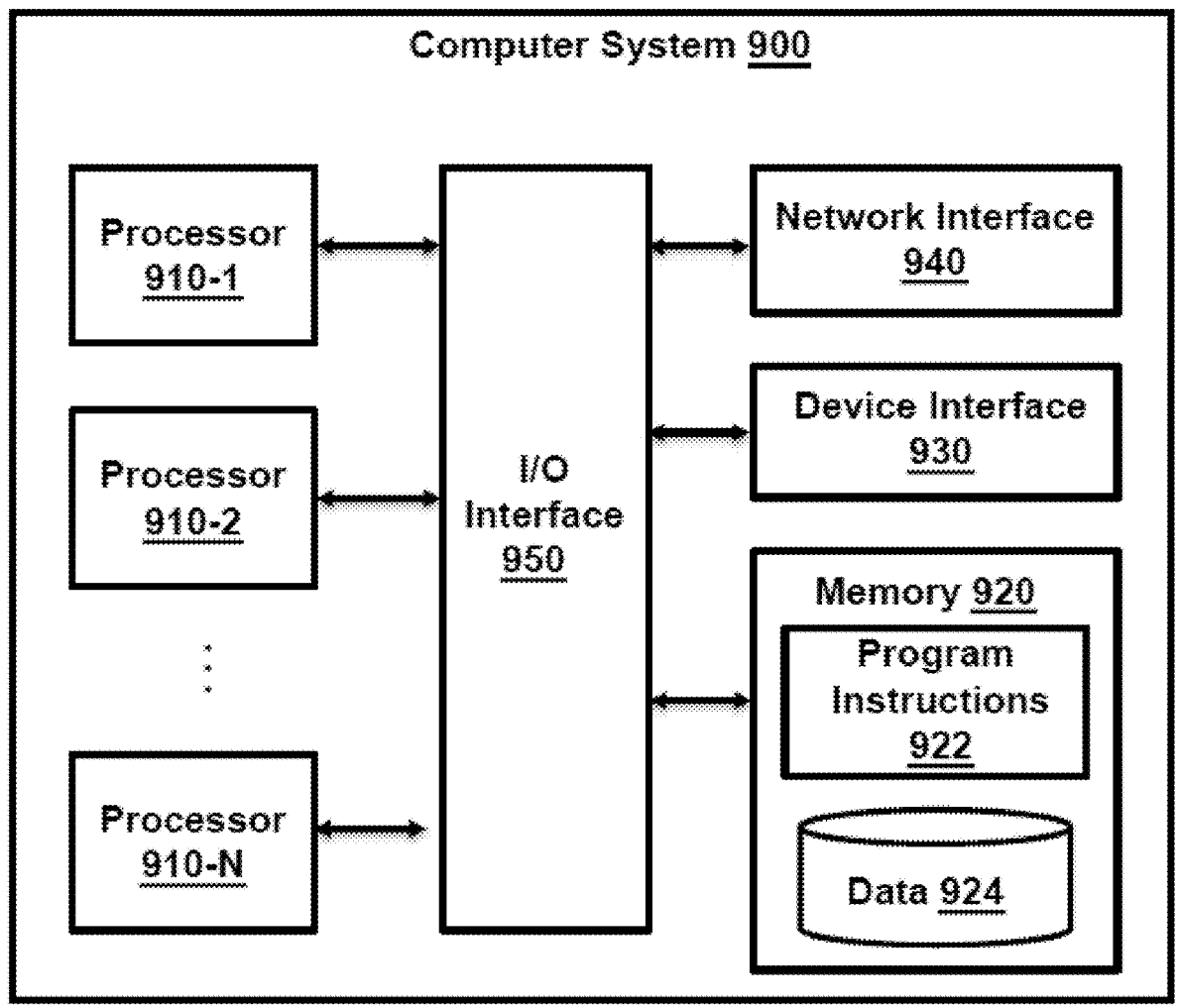
FIG. 9 shows a computer system for implementing one or more of the aforementioned aspects, in accordance with various embodiments.

FIG. 9 shows an example computer system 900 for implementing one or more of the aforementioned aspects, in accordance with various embodiments. Computer system 900 may depict one or more components of provider client device 104. In some embodiments, one or more components described by computer system 900 may be excluded by provider client device 104. Furthermore, one or more additional components may be included by provider client device 104, and the foregoing is merely illustrative.

In some cases, multiple instances of computer system 900 may communicate via a network to implement the present techniques in a distributed fashion. In some cases, instances may include a mobile computing device (like a smartphone with a camera) that captures images upon which the present patent application's techniques operate. In some cases, the instances may include server-side instances (e.g., in a microservices architecture or monolithic architecture) that execute training and analysis with trained models. Various portions of systems and methods described herein, may include or be executed on one or more computer systems similar to computer system 900. Further, processes and modules described herein may be executed by one or more processing systems similar to that of computer system 900.

Computer system 900 is configured to include one or more processors (e.g., processors 910-1-1510-N) coupled to memory 920, an input/output I/O device interface 930, and a network interface 940 via an input/output (I/O) interface 950. As described herein, a processor can include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 900. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive computer program instructions and data from a memory (e.g., memory 920). Computer system 900 may be a uni-processor system including one processor (e.g., processor 910a), or a multi-processor system including any number of suitable processors (e.g., 910-1-1510-N). Multiple processors may be employed to provide for parallel or sequential execution of one or more portions of the techniques described herein. Processes, such as logic flows, described herein are capable of being performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 900 may include a plurality of computing devices (e.g., distributed computer systems) to implement various processing functions.

I/O device interface 930 is configured to provide an interface for connection of one or more I/O devices, such as computer system 102, wearable device(s) 104, and/or provider client device 104, to computer system 900. I/O devices may include devices that receive input (e.g., from a patient, provider) or output information (e.g., to a user, provider). I/O devices (e.g., provider client device) may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computer system 900 through a wired or wireless connection. I/O devices may be connected to computer system 900 from a remote location. I/O devices located on remote computer system, for example, may be connected to computer system 900 via a network and network interface 940.

Network interface 940 may include a network adapter that provides for connection of computer system 900 to a network. Network interface 940 may facilitate data exchange between computer system 900 and other devices connected to the network. Network interface 940 may support wired or wireless communication. The network may include an electronic communication network, such as the Internet, a local area network (LAN), a wide area network (WAN), a cellular communications network, or the like.

System memory 920 may be configured to store computer program instructions 922 and/or data 924. Computer program instructions 922 may be executable by a processor (e.g., one or more of processors 910-1-1510-N) to implement one or more embodiments of the present patent application's techniques. Computer program instructions 922 may include modules of computer program instructions for implementing one or more techniques described herein with regard to various processing modules. Computer program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

Memory 920 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. Memory 920 may include a non-transitory computer readable storage medium that may have program instructions stored thereon that are executable by a computer processor (e.g., one or more of processors 910-1-1510-N) to cause the subject matter and the functional operations described herein. A memory (e.g., memory 920) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 950 may be configured to coordinate I/O traffic between processors 910-1-1510-N, system memory 920, network interface 940, I/O devices (e.g., wearable device(s) 104, provider client device 104), and/or other peripheral devices. I/O interface 950 may perform protocol, timing, or other data transformations to convert data signals from one component (e.g., memory 920) into a format suitable for use by another component (e.g., processors 910-1-1510-N). I/O interface 950 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 900 or multiple computer systems 900 configured to host different portions or instances of embodiments. Multiple computer systems 900 may provide for parallel or sequential processing/execution of one or more portions of the techniques described herein.

Those skilled in the art will appreciate that computer system 900 is merely illustrative and is not intended to limit the scope of the techniques described herein. Computer system 900 may include any combination of devices or software that may perform or otherwise provide for the performance of the techniques described herein. For example, computer system 900 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 900 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all the software components may execute in memory on another device and communicate with the illustrated computer system via inter-computer communication. Some or all the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present patent application contemplates that, to the extent possible, one or more features of any embodiment can be combined with one or more features of any other embodiment.

The present techniques will be better understood with reference to the following enumerated embodiments:

1. A method for controlling interactions between a plurality of applications, based on interaction pattern data, application conformance data and application instance data.
2. The method of embodiment 1, where the interaction pattern data includes roles, transactions, APIs, options, or role dependencies, wherein the transaction is associated with or connects at least a pair of roles, wherein the transaction is performed using an API.
3. The method of embodiments 1-2, wherein the application conformance data includes application data of the plurality of applications and roles implemented by the applications, wherein a role is one of the roles defined in the interaction pattern data.
4. The method of embodiments 1-3, where the application instance data includes, for an instance of an application, API location data, roles and options enabled for the instance.
5. The method of embodiment 4, where the API location data includes URL of endpoint hosting the API.
6. The method of embodiments 1 and 4, wherein the application instance data includes access permissions between applications.
7. The method of embodiments 6, wherein the access permissions define a permission for a first application to access a second application or a group of applications.
8. The method of embodiments 6-7, wherein the access permissions define a permission for a group of applications to access a particular application.
9. The method of embodiments 6-8, wherein the access permissions define a permission for a first application to access an enabled role on a second application.
10. The method of embodiments 1-9 further comprising: providing a discovery API to enable an application to retrieve accessible APIs on other applications.
11. The method of embodiments 1-10, wherein accessibility to an API associated with a second application is determined based on application permissions, application conformance, and interaction patterns.
12. The method of embodiment 11 further comprising: determining that the API is accessible based on (a) an instance of first application ("first application instance") is allowed to communicate with an instance of the second application ("second application instance"); (b) the first application is implementing a first role and the second application is implementing a second role; (c) the first role is enabled for the first application instance, and the second role is enabled for the second application instance; (d) a transaction is defined between the first role and the second role, where the first role is the source of the transaction and the second role is the target of the transaction; and (e) the transaction is defined to use the API.

13. The method of embodiments 1-12 further comprising: providing an authorization API to enable a second application to validate access to an API by a first application.

14. The method of embodiments 1-13, wherein validating the access to the API is determined based on the operations of embodiment 12.

15. The method of embodiments 1-14 further comprising: providing a gateway that routes data between applications.

16. The method of embodiment 15, wherein the gateway is configured based on the API location data.

17. The method of embodiment 16, wherein the gateway restricts routing data to an API associated with an application, wherein the routing is determined based on the application instance data, access permissions, the application conformance data and the interaction pattern data.

18. The method of embodiment 17, wherein the gateway is configured to route the data from a source application to the API if the application has access to that API according to the operations of embodiment 12.

19. The method of embodiments 16-18, wherein the gateway is configured to execute authorization logic before forwarding the request from the source application to a targeted endpoint hosting the API associated with the application.

20. The method of embodiments 16-19, wherein the gateway is configured to log information regarding data routed between applications for consumption by a metering system.

21. The method of embodiment 20, wherein the log is tagged with interaction pattern data such as API, transaction or roles.

22. The method of embodiment 15 further comprising: providing multiple gateways, wherein the gateways form a network topology, wherein each gateway routes data from and to an application within a network zone of the corresponding gateway, wherein the gateways communicate data amongst each other between network zones.

23. The method of embodiment 22, wherein the network topology includes a mesh network or a star network.

24. The method of embodiments 10 and 15, wherein the discovery API replaces location data of an API with location data of an instance of a gateway to insert the gateway in the communication path between the application and a target application having the API the application has requested access to.

What is claimed is:

1. A method for controlling communication between a plurality of applications with a computer system, the computer system comprising one or more hardware processors, the method comprising:
generating interaction pattern data, wherein the interaction pattern data defines, for each interaction of a plurality of interactions, a plurality of roles, wherein each role is associated with a transaction that is performed with another role, wherein the transaction is performed using an application programming interface (API);
generating application conformance data, wherein the application conformance data defines, for each application of a plurality of applications, a set of roles implemented by the corresponding application;
generating application instance data, wherein the application instance data includes location data of a plurality of APIs associated with an instance of an application of the plurality of applications; and
controlling communication between a first application of the plurality of applications and a second application of the plurality of applications based on the interaction pattern data, the application conformance data and the application instance data.

2. The method of claim 1, wherein generating the interaction pattern data includes:
associating a first role of the plurality of roles and a second role of the plurality of roles with a specified transaction to enable the first role and the second role to communicate with each other.

3. The method of claim 2, wherein the first role is a consumer of an API associated with the specified transaction based on the interaction pattern data indicating that the first role is a source of the specified transaction.

4. The method of claim 2, wherein the first role is a provider of an API associated with the specified transaction based on the interaction pattern data indicating that the first role is a target of the specified transaction.

5. The method of claim 1, wherein generating the application conformance data includes:
configuring the first application to implement a first role and the second application to implement a second role for enabling the first application to invoke an API associated with the second application, wherein the interaction pattern data indicates that the first role is configured to invoke the second role for performing a transaction using the API associated with the second application.

6. The method of claim 1, wherein generating the application instance data includes:
configuring, for the instance of the application, the location data by specifying a uniform resource locator (URL) for accessing the plurality of APIs.

7. The method of claim 1, wherein controlling the communication between the first application and the second application includes:
receiving, at a server, from a client device executing an instance of the first application, a request for a list of APIs accessible by the first application, wherein the list of APIs is associated with one or more of the plurality of applications;
determining, by the server using a discovery API,
(a) a set of roles implemented by the first application based on the application conformance data,
(b) a subset of roles from the set of roles that are configured as a source of one or more transactions based on the interaction pattern data, and
(c) the list of APIs associated with one or more transactions; and
returning information having the list of APIs to the client device.

8. The method of claim 7, wherein the information includes location data associated with each API of the list of APIs.

9. The method of claim 7, wherein the information includes application ID of an application with which each API of the list of APIs is associated.

10. The method of claim 7, wherein the information includes a validity indicator indicating a time until which data provided in the list of APIs is valid.

11. The method of claim 8 further comprising:
invoking, by the first application, a specified API from the list of APIs using the location data, wherein the specified API is associated with the second application.

12. The method of claim 1, wherein controlling the communication between the first application and the second application includes:
receiving, at a server executing an instance of the second application, from a client device executing an instance of the first application, a request to invoke a specified API associated with the second application,
determining, by the server and using an authorization API, whether the first application is permitted to access the second application based on access permissions configured for instances of the plurality of applications,
in response to determining that the first application is permitted to access the second application, determining, by the server, a set of APIs associated with the second application accessible by the first application based on the interaction pattern data and the application conformance data, and
permitting, by the server, the first application to invoke the specified API based on a determination that the specified API is one of the set of APIs.

13. The method of claim 1, wherein controlling the communication between the first application and the second application includes:
determining, using a discovery API, information regarding a set of APIs associated with the second application that is accessible by the first application, wherein the information includes addresses of the set of APIs in a computer network, and
configuring a gateway subsystem to route a request from the first application for accessing a specific API of the second application to a specified address in the computer network.

14. The method of claim 1, wherein controlling the communication between the first application and the second application further includes:
determining, using a metering subsystem, information regarding communication between the first application and the second application, wherein the information includes a type of interaction pattern, a quantity of interactions with a specified application, or performance metrics associated with the plurality of applications.

15. A non-transitory computer readable medium comprising computer program instructions that, when executed by one or more processors, effectuate operations comprising a method of claim 1.

16. A system for controlling communication between a plurality of applications in a computer network, the system comprising:
one or more processors configured by machine-readable instructions to:
generate interaction pattern data, wherein the interaction pattern data defines each interaction of a plurality of interactions using a plurality of roles, wherein each role is associated with a transaction that is performed with another role, wherein the transaction is performed using an application programming interface (API),
generate application conformance data, wherein the application conformance data defines, for each application of a plurality of applications, a set of roles implemented by the corresponding application,
generate application instance data, wherein the application instance data includes location data of a plurality of APIs associated with an instance of an application of the plurality of applications, and
control communication between a first application of the plurality of applications and a second application of the plurality of applications based on the interaction pattern data, the application conformance data and the application instance data.

17. The system of claim 16, wherein the one or more processors is caused to generate the interaction pattern data by associating a first role of the plurality of roles and a second role of the plurality of roles with a specified transaction to enable the first role and the second role to communicate with each other.

18. The system of claim 17, wherein the one or more processors is further caused to configure an option of a specified API associated with the specified transaction, wherein the option enables or disables a portion of the specified API from being accessed.

19. The system of claim 16, wherein the one or more processors is caused to generate the application conformance data by:
configuring the first application to implement a first role and the second application to implement a second role for enabling the first application to invoke an API associated with the second application, wherein the interaction pattern data indicates that the first role is configured to invoke the second role for performing a transaction using the API associated with the second application.

20. The system of claim 16, wherein the one or more processors is caused to control the communication between the first application and the second application by:
determining, using a discovery API, a list of APIs accessible by the first application, wherein the determining includes determining:
(a) a set of roles implemented by the first application based on the application conformance data,
(b) a subset of roles from the set of roles that are configured as a source of one or more transactions based on the interaction pattern data, and
(c) the list of APIs associated with one or more transactions; and
returning information having the list of APIs to the first application.

21. The system of claim 20, wherein the one or more processors is further caused to invoke, from the first application, a specified API from the list of APIs using the location data, wherein the specified API is associated with the second application.

22. A method for controlling communication between a plurality of applications with a computer, the computer including one or more processors, the method comprising:
receiving a request from a first application of a plurality of applications to invoke a specified API associated with a second application of the plurality of applications;
obtaining interaction pattern data and application conformance data from a storage system,
wherein the interaction pattern data defines each interaction of a plurality of interactions using a plurality of roles, wherein each role is configured to consume an API from another role, or provide the API to another role, wherein the application conformance data defines, for each application of a plurality of applications, a set of roles implemented by the corresponding application;

determining, based on the application conformance data and the interaction pattern data, that the first application is configured to implement a first role and the second application is configured to implement a second role, wherein the interaction pattern data indicates that the first role is configured to consume the specified API associated with the second role; and permitting the first application to invoke the specified API.

23. A non-transitory computer readable medium comprising computer program instructions that, when executed by one or more processors, effectuate operations comprising a method of claim 22.

24. A system for controlling communication between a plurality of applications in a computer network, the system comprising:

one or more processors configured by machine-readable instructions to:
obtain configuration data from a configuration subsystem, the configuration data including:
interaction pattern data, wherein the interaction pattern data defines an interaction using a plurality of roles, wherein each role is a consumer of an application programming interface (API) or a provider of the API,
application conformance data, wherein the application conformance data defines a set of roles implemented by an application, and
application instance data, wherein the application instance data includes network address of a plurality of APIs associated with an instance of the application;
configure a gateway subsystem based on the configuration data to:
generate network route data for routing a request, from a first application for accessing a specified API associated with a second application, to a specified network address associated with the specified API; and
control communication between the first application and the second application via the gateway subsystem based on the configuration data.

25. The system of claim 24, wherein the one or more processors are configured by machine-readable instructions to:
configure a metering subsystem to determine information regarding communication between the first application and the second application, wherein the information includes a type of interaction pattern, a quantity of interactions with the first or the second application, or performance metrics associated with the first or the second application.

26. The system of claim 24, wherein the one or more processors are caused to control the communication between the first application and the second application by:
determining, using a discovery API of the configuration subsystem, information having a list of APIs accessible by the first application, wherein the information includes:
(a) a set of roles implemented by the first application based on the application conformance data,
(b) a subset of roles from the set of roles that are configured as a source of one or more transactions based on the interaction pattern data, and
(c) the list of APIs associated with one or more transactions; and
returning the information having the list of APIs to the first application.

27. The system of claim 24, wherein the one or more processors are caused to control the communication between the first application and the second application by:
receiving, from a client device executing an instance of the first application, a request to invoke a specified API associated with the second application,
determining, using an authorization API of the configuration subsystem, whether the first application is permitted to access the second application based on access permissions configured for an instance of the first application in the configuration subsystem,
in response to determining that the first application is permitted to access the second application, determining a set of APIs associated with the second application accessible by the first application based on the configuration data, and
permitting the first application to invoke the specified API, via the gateway subsystem, based on a determination that the specified API is one of the set of APIs.

* * * * *